United States Patent [19]

Buehner et al.

[11] 4,216,480

[45] Aug. 5, 1980

[54] MULTIPLE SPEED INK JET PRINTER

[75] Inventors: William L. Buehner; James D. Hill, both of Lexington, Ky.

[73] Assignee: International Business Machines Corporation, Armonk, N.Y.

[21] Appl. No.: 960,417

[22] Filed: Nov. 13, 1978

[51] Int. Cl.[2] .......... G01D 15/18
[52] U.S. Cl. .......... 346/75
[58] Field of Search .......... 346/75

[56] References Cited

U.S. PATENT DOCUMENTS

| | | | |
|---|---|---|---|
| 3,604,846 | 9/1971 | Behane et al. | 346/75 UX |
| 3,723,646 | 3/1973 | Behane et al. | 346/75 X |
| 3,878,517 | 4/1975 | Kasubuchi et al. | 346/75 |
| 3,928,718 | 12/1975 | Sagae et al. | 346/75 X |
| 3,975,740 | 8/1976 | Distler et al. | 346/75 |
| 3,977,007 | 8/1976 | Berry et al. | 346/75 X |

*Primary Examiner*—George H. Miller, Jr.
*Attorney, Agent, or Firm*—William J. Dick

[57] ABSTRACT

Disclosed is a multi speed ink jet printer in which alternate vertical scans of the ink stream may be omitted or alternate dots horizontally may be omitted or a combination of the two. In the alternate vertical scan omit mode, a factor of two increases in the speed of printing may be obtained, the same being true of a horizontal row dot omission. Moreover, a combination of the two permits up to a four times speed increase. In essence, while the rate of the ink stream remains constant, the predetermined maximum number of dots (picture elements) in a character box is decreased (resolution decreased) to permit an increase in the speed of printing.

20 Claims, 10 Drawing Figures

NOTE: CIRCUIT SYMBOLS USED HEREIN ARE SHOWN BELOW

MULTIPLE SPEED INK JET PRINTER

SUMMARY OF THE INVENTION

The present invention relates to ink jet printers of the Sweet type, and more particularly relates to an ink jet printer having provisions for operation at multiple speeds with a con-commitent change in character resolution.

STATE OF THE PRIOR ART

The IBM 6640 Ink Jet Printer which is utilized in IBM's 6640, 6650 Office System 6 is a continuous stream type ink jet printer based upon the Sweet principle as described in U.S. Pat. No. 3,596,275 issued on July 27, 1971 to Richard G. Sweet. In this system, a perturbated stream of ink drops is emitted from a nozzle under pressure, the stream breaking up into small drops at a predetermined point or distance from the nozzle. As the droplets are formed, they receive a charge in a charge ring or electrode and then pass between a high voltage pair of deflection electrodes, the amount of charge determining the deflection height of the ink droplets so as to form characters or other indicia on paper or the like adjacent to the discharge side of the deflection electrodes. If no indicia are to be formed, the drops receive no or little charge and as a consequence are not deflected when passing through the deflection electrodes, the drops then passing into a gutter for recirculation in the ink system.

As may be seen from the above, the vertical deflection of the drops is used to form a column of ink dots (called a scan) at the paper plane. Each successive drop in a scan is given a slightly greater charge so that the scan is constructed, in the example given, from bottom to top. Thus the characters are formed within a particular matrix by making a succession of scans. Typically the printhead elements are located on a movable carrier that travels in a predetermined path along the print surface cooperating with the vertical scan to provide the means for printing characters or other indicia on the print surface.

The IBM 6640 has a character resolution which gives a print quality substantially equal to typewriter print quality, the resolution being 94.5 pel/cm (240 pel/inch). A pel is defined as a picture element, in the instance of an ink jet printer a dot. For example, with a 94.5 pels/cm (240 pel per linear inch) resolution, and a character box 4.23 mm (1/6 inch) high (character matrix height) and employing a 10 pitch character, a dot matrix of $240/10=24$ pels wide (horizontal) and $240\times 1/6=40$ pels or dots high may be formed. Thus a character matrix for each character in a 10 pitch character example, is 40 drops by 24 drops or dots or pels appearing on the paper. In this connection, in the IBM 6640, the relative dot placement tolerance is only plus or minus 0.033 mm ($\pm 0.0013$ inches) while a character height and width tolerance of 0.076 mm (0.003 inches) is necessary to meet print quality requirements. Because of the gutter requirements, the character matrix height requires a maximum drop deflection of 0.51 cm (0.2 inches) since approximately 0.09 cm is needed to clear the gutter.

The IBM 6640 prints at a rate of approximately 90 characters per second, the resolution of the characters approaching that of high quality typewriter print. However, oft times it is not essential that the print be of such high resolution, especially if the document being generated by the printer is for "in house" use or, for example, for advertising circulars or mailers and the like.

In view of the above, it is a principal object of the present invention to provide an ink jet printer having the capability of varying its character resolution with a commensurate increase or decrease, as the case may be, in the speed of printing.

In the first embodiment, which may be termed the draft mode, there is a regular or periodic effective elimination of the start-of-scan signal, for example the nullifying of every other start-of-scan signal so that the printer only prints every other scan (column) of dots allowing the speed of the carrier to be approximately doubled. In this connection, alteration of the preset angle of the deflection electrodes may be avoided, if the tilt is objectionable when in the draft modes by employing the teachings of Ser. No. 864,066, filed Dec. 23, 1977 (now U.S. Pat. No. 4,138,688, issued Feb. 6, 1979) for automatically changing the tilt of the deflection electrodes dependency on carrier speed. In a second embodiment, every other dot in the scan is eliminated such that alternate rows of dots are missing. However, aerodynamic and drop interaction correction must be altered to compensate for skipping alternate dots or pels in a scan. Thus in the first embodiment, which may be termed scan skipping, while the width and height of the character box does not change, the maximum number of drops (pels) in each horizontal row with for example, a 10 pitch character is 12 (24/2), while the maximum number of dots vertically is still 40 for each scan. In the second embodiment, wherein every other horizontal row of dots is missing, the maximum number of dots in a character box is 24 (again utilizing the 10 pitch example) in the horizontal direction, but only 20 dots for each scan in the vertical direction, both embodiments permitting the speeding up of the carrier movement while maintaining the predetermined rate of the ink stream. Moreover, it is a simple matter to combine both scan skipping and horizontal row dot skipping so that the carrier may be speeded up to, for example, 4 times the quality mode speed. In this connection, minimal alteration of the existing hardware or electronics is necessary from the existing IBM 6640 for at least the scan skip draft mode.

In discussing drops and dots, the mean ink drop diameter in the IBM 6640 is 0.06 mm or 0.0025 inches.

In the quality mode of printing, the dots are printed on a matrix of 0.004 inches or 0.1 mm centers. Because of ink drop spread on the receiving medium (usually paper) the drops expand into dots approximately 0.006 inches or 0.15 mm in diameter, which means an overlap of the drops on the paper. In this context, in the first draft mode (preferred) of the present invention, the dots are on 0.008 inches or 0.2 mm centers horizontally and 0.004 inches or 0.1 mm centers vertically; in an alternative embodiment, i.e., horizontal row dot omission, the dots are on 0.004 inches or 0.1 mm centers horizontally and 0.008 inches or 0.2 mm centers vertically. Of course on the combination mode, the dots are on 0.008 inches or 0.2 mm centers both vertically and horizontally. In essence, the matrix resolution is sacrificed for a concomitant increase in speed, without changing or otherwise altering the predetermined rate of the ink stream.

With regard to the prior art, there are two references, notably U.S. Pat. No. 3,878,517 issued on Apr. 15, 1975 and U.S. Pat. No. 3,938,641 issued on Feb. 17, 1976 which present the closest prior art of which applicants are at this time aware. The U.S. Pat. No. 3,878,517 relates to an ink jet system of the charge amplitude controlling type in which the printing velocity is controlled between a high velocity or low velocity mode, a control circuit within the character generator emits a signal which controls the drive rate to a servo motor connected to the carrier. Additionally, while the frequency of formation of ink drops remains constant, the control circuit, depending upon whether the apparatus is in a high velocity or low velocity mode emits a control signal to an adjustable frequency divider which changes the ratio of the number of drops receiving a video signal to the total number of drops formed to thereby compensate for changes in speed. In the printing apparatus disclosed herein, the ratio of charged to uncharged drops used in both what may be termed the draft and quality mode of printing remains essentially the same. There is no modification of the frequency of occurrence of the charging drops and the resulting ratio to the charged ink drops to the total ink drops in the stream by adjustment of any frequency division rate or of a frequency divider in response to a rate control signal.

The U.S. Pat. No. 3,938,641 describes a sequential dot matrix printer with a stepping type drive. The patent defines the controlling of the rate of column movement by changing the print rate signal. In either of the modes of operation heretofore described, there is no variation in the frequency to change the speed of the carrier or to change the speed of printing.

Other objects and a more complete understanding of the invention may be had by referring to the following specification and claims taken in conjunction with the accompanying drawings in which:

Figure 1:
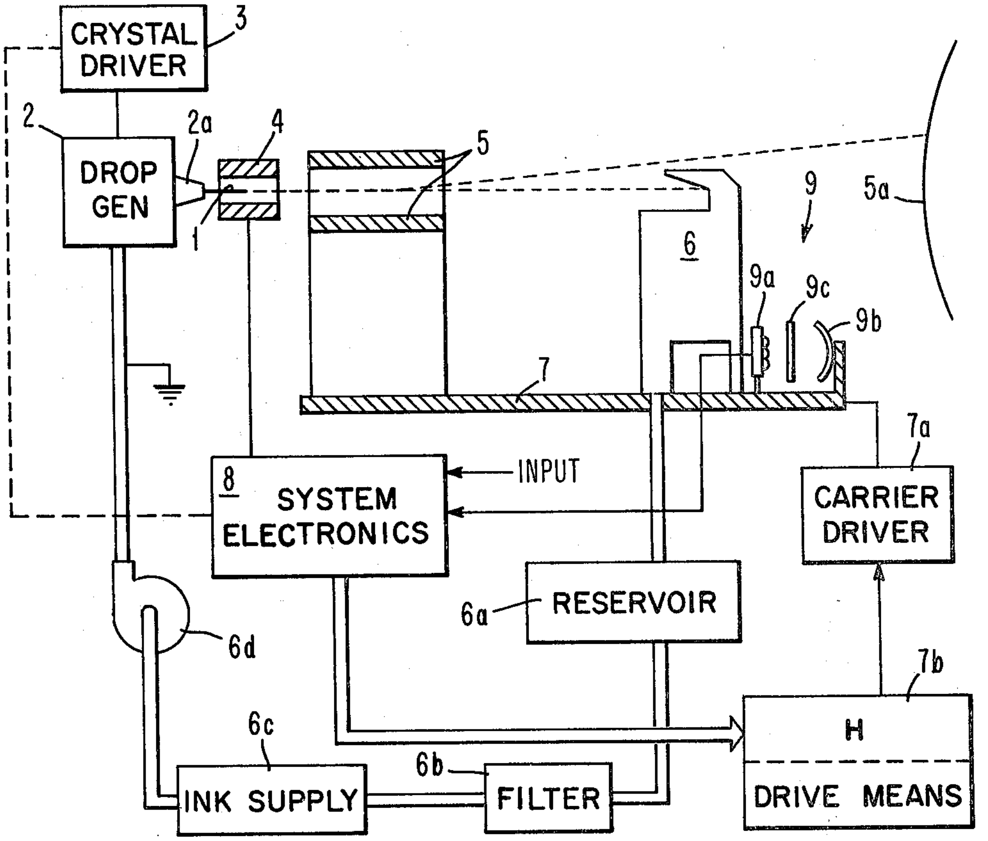
FIG. 1 is a fragmentary schematic view of an ink jet printer incorporating the subject matter of the present invention.
Figure 1A:
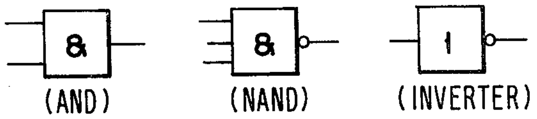
FIG. 1*a* is a symbology diagram indicating the symbols used in the circuits shown in FIGS. 6 and 7.

Referring now to the drawings, and especially FIG. 1 thereof, an ink jet printer is schematically illustrated therein. Basically, ink 1 under pressure is forced through a nozzle 2*a* as from a drop generator 2 to form a jet. While the jet would normally break up into a stream of drops of quazi random size and spacing, drop formation is controlled by vibrating the ink within the nozzle cavity at a fixed ultrasonic frequency as by a crystal driver 3, the crystal driver exciting a piezoelectric crystal within the drop generator 2. The pressure waves cause the jet 1 to break up into a stream of drops of uniform size and spacing at a well defined distance from the nozzle 2*a*. A typical drop generator structure is illustrated in IBM Technical Disclosure Bulletin, Vol. 21, No. 5, October 1978 at pages 1949, 1950.

A voltage applied to a charge electrode 4 surrounding the break up point (jet stream into drops) induces an electrical charge of a specific predetermined magnitude on the forming drop. This charge is retained by the drop throughout its flight to a drop receiving medium 5 such as paper and the like. The stream of drops passes through an electrostatic field formed by a fixed high voltage across a pair of horizontally disposed deflection plates 5. Because the charge on each drop is controlled individually, a drop can be deflected vertically a desired amount. In the instance of the IBM 6640 document printer, the drops are reflected vertically from bottom to top, one column of dots and/or spaces being referred to herein as a scan. If in forming a character, a particular space in a scan is to be left white, (unprinted) it is blanked by leaving the drops uncharged. These uncharged or undeflected drops are intercepted by a gutter 6 and recycled to an ink reservoir 6*a* through a filter 6*d*, an ink supply reservoir 6*c* and from there to the suction side of an ink pump 6*d*. The pump supplies ink on a continuing basis therefor to the drop generator 2. A typical ink recirculating system for ink jet printing apparatus is disclosed in U.S. Pat. No. 3,929,071, issued on Dec. 30, 1975 to the assignee of the present invention. Moreover, inasmuch as the height that the deflected drop will appear on the print receiving medium 5*a* is directly related to the residence time of the drop between the deflection plates 5 (that is for a given charge, the longer the resident time between the deflection plates 5 the higher the deflected drop) indicating that the velocity of the ink droplet or ink jet stream must be accurately controlled. In U.S. Pat. No. 3,787,882, issued on Jan. 22, 1974, is disclosed a number of servo systems for controlling the velocity of the stream by sensing the velocity and then servoing the pump to obtain the desired pressure within the drop generator 2. Another means of determining the velocity of the drop for obtaining servo control of the ink pump so as to control the velocity of the ink stream is disclosed in Ser. No. 843,081, filed on Oct. 17, 1977 to K. Meece et al.

The drop generator 2, charge electrode 4, deflection plates 5 and gutter 6 are all mounted on a carrier 7 which is driven horizontally along a predetermined print path, that is into and out of the plane of the paper in FIG. 1, at a relatively constant speed during the printing operation. In this manner, drops are deposited in appropriate positions within a character box or raster area to form the desired indicia or character. The carrier 7 is driven into and out of the paper by a carrier driver 7*a*, for example a DC motor in a controllable manner as by H drive means 7*b* (in the preferred embodiment) under control of the system electronics 8. The carrier driver 7*a*, H drive means 7*b* and portion of the system electronics 8 employed for movement of the carrier 7 into and out of the plane of the paper in FIG.

1 is fully set forth in co-pending patent application Ser. No. 954,374 of Morgan et al filed on Oct. 24, 1978, and incorporated herein by reference.

With the ink jet printer in operation, either in an interactive or on-the-fly or continuous printing mode, it is mandatory that some means be provided for indicating where the carrier is at any particular time so that the start of each scan may be determined in order that the charge electrode may receive the correct data or voltage level for proper deflection of the ink drops. Moreover, there must be some means provided for determining the direction of motion of the carrier. In this connection, a detector 9 which includes a light emitting and receiving matrix 9*a*, and a concave mirror 9*b* are disposed on the carrier on opposite sides of a fixed grating strip 9*c* (mounted on the machine frame), the grating strip in conjunction with the matrix and mirror permitting the output of signals to the system electronics for both charge electrode charging purposes as well as for controlling the H drive 7*b* and thus the carrier driver 7*a* connected to the carrier 7. In this connection, the detection apparatus and scheme is disclosed more fully in the Cialone and West patent application, Ser. No. 920,305 filed on June 28, 1978 and incorporated herein by reference. Moreover, the detection circuitry employed, while being disclosed in the aforementioned co-pending application, is also described in the co-pending application of Pettit, Ser. No. 920,306 also filed on June 28, 1978 and incorporated herein by reference. The grating 9*c* is a dual grating having opaque and transparent interdigitations, one grating portion being offset from another grating portion by 90°. The detector matrix includes a pair of light sources and a pair of detectors, light passing through the grating is reflected by the mirror 9*b* and impinges on the detectors which, with their associated circuitry output an alternating signal such as the output signals illustrated below the letter "B" illustrated in FIGS. 2, 3, and 4. (For purposes of identification, the two detector output has been labelled Det. A Det. B). One of the two detector outputs may be employed in conjunction with a counter to count the transistions (opaque to transparent), and by having a predetermined number of transistions on the grating thereby indicate absolutely the position of the carrier 7 at any point during its traverse along the print path. In the illustrated instance, in FIGS. 2, 3 and 4, the detector B output is utilized to indicate the position of the carrier and by simply interpolating the space of one cycle into four, the start-of-scan or SOS information may be derived.

Figure 4:
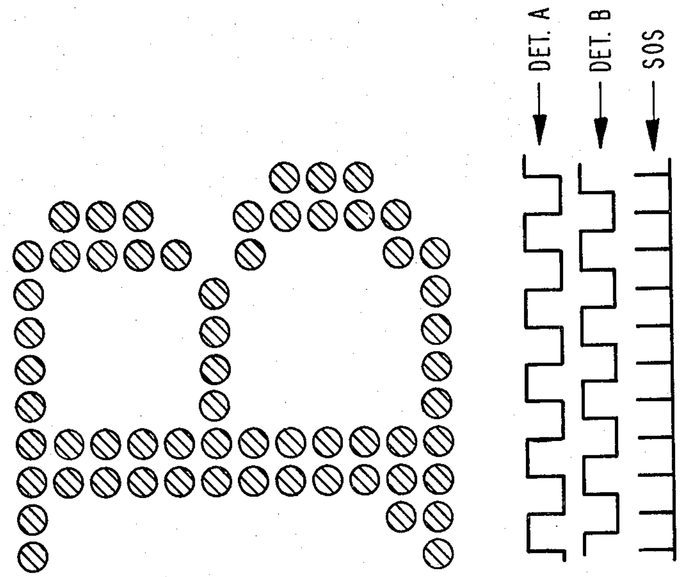
FIG. 4 is similar to FIG. 3 except showing the same character formed in a "draft" mode as accomplished by an alternate embodiment of the present invention.
Figure 3:
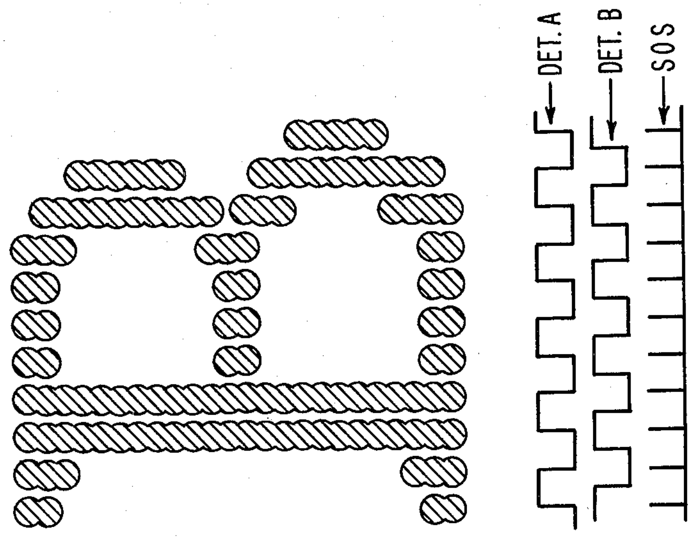
FIG. 3 is similar to FIG. 2 except showing the same character formed in a "draft" mode or second resolution.
Figure 2:
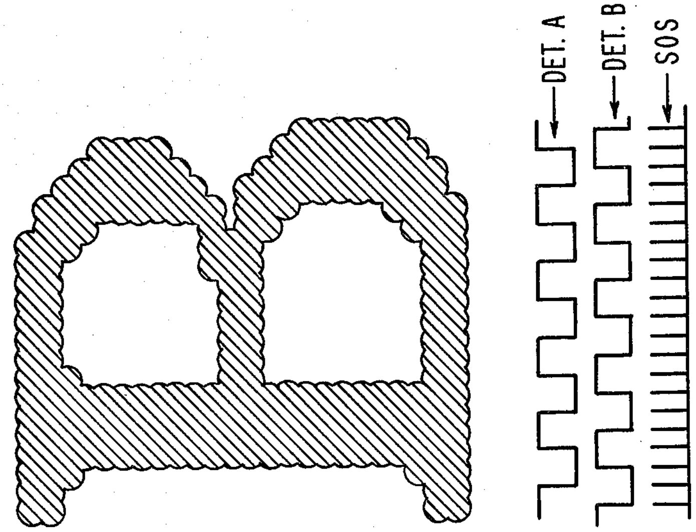
FIG. 2 is an enlarged character representation illustrating the formation of a character by the machine shown in FIG. 1 with a first resolution, or quality mode of operation, and with suitable grating signals below the character along with start-of-scan signal representations.

The pulses indicated in FIGS. 2, 3 and 4 and labelled SOS indicate the start-of-scan of the ink stream. By way of example, if the grating associated with detector B output has 60 divisions per linear inch of grating (23.6 divisions per cm), and the resolution is 240 pels/inch (94.5 pels/cm) then each division of the grating must be further divided by four to meet the resolution requirements to form a character such as the letter "B" illustrated in FIG. 2. (The second detector output such as the detector A output is used for comparison with the detector B output to indicate to the electronics the direction of motion of the carrier).

In accordance with the invention, the resolution of a character may be changed to, for example, the resolution of the character illustrated in FIG. 3, the resolution being termed hereinafter draft mode 1. This is accomplished, in the instance of the resolution of the character "B" as shown in FIG. 3 by speeding up the carrier and simultaneously therewith eliminating every other start-of-scan (SOS) signal which is utilized to charge the charge electrode 4. A second "draft" mode alternative may be accomplished by skipping alternate rows of dots (horizontal rows) during the vertical scan. In this connection, correction of the normal aerodynamic and drop interaction repulsions must be taken into account, as by a modified correction memory. Alternatively, and as shown in FIG. 4, draft mode 1 may be further modified as illustrated in FIG. 3 by combining with "draft" mode 2 and skipping every other dot in a horizontal mode thereby resulting in the decrease in resolution illustrated in the character "B" illustrated in FIG. 4. In this mode, a speed increase may be realized of up to four times the speed of the printed character illustrated in FIG. 2 wherein a quality mode or quality resolution figure "B" is shown.

Figure 5:
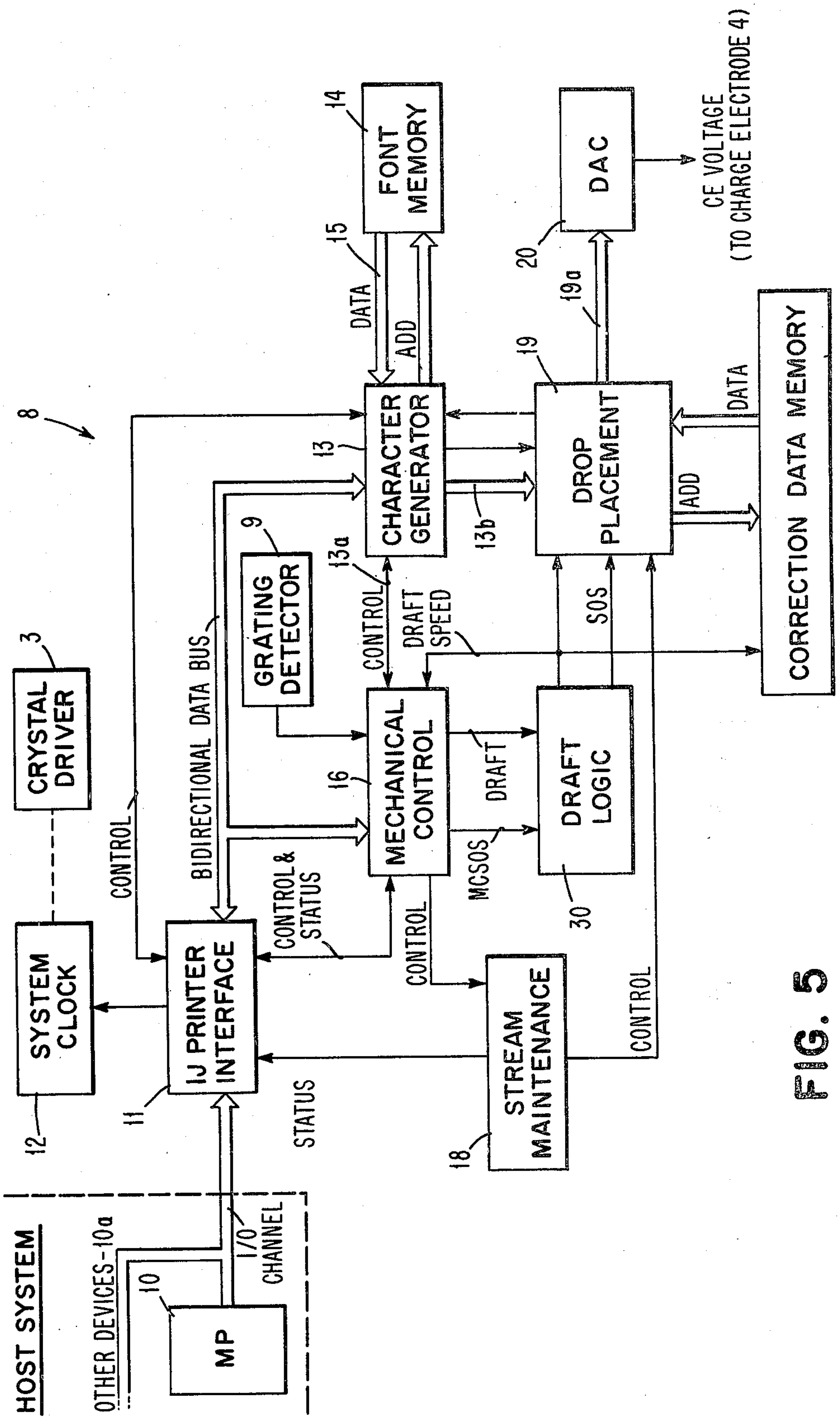
FIG. 5 is a schematic representation of the electronics of an ink jet printer incorporating the apparatus of the present invention.

With the above background in mind, and turning first to FIG. 5, FIG. 5 illustrates the system electronics 8 including the apparatus constructed in accordance with the present invention. At the outset it should be recognized that the electronic diagram illustrated in FIG. 5 is substantially the same as the printer electronics utilized in the IBM 6640 ink jet printer with the exception of the function block labelled "draft logic" 30 and with some changes in the drop placement function block 19, both of which are discussed hereinafter relative to FIG. 6 (draft logic) and FIG. 7 drop placement logic.

Figure 9:
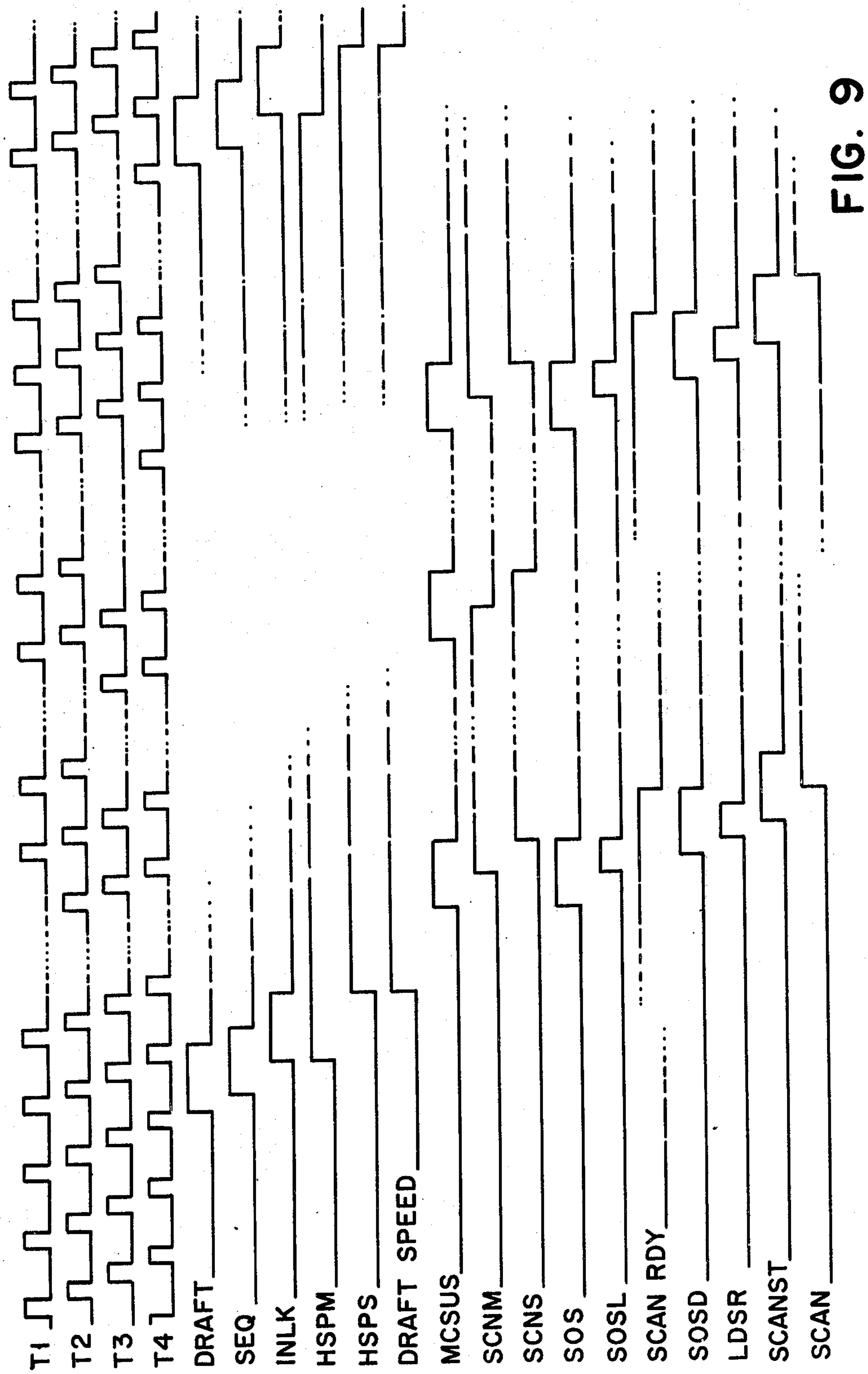
FIG. 9 is a signal representation of a timing chart indicating the timing of the signals nmemonically represented in FIGS. 6 and 7 for proper operation of the printer in the first or preferred "draft" mode.

Referring first to FIG. 5, a microprocessor or the like 10 with other input devices 10*a*, for example, tape, disc drive, typewriter, mag card etc. acts as a host system to the ink jet system illustrated in block diagram form in FIG. 5. The input to the printer is fed thereto by way of eight (in the illustrated instance) data lines, four control lines, an interrupt line and a master clock signal line making 14 lines which make up the I/O channel. The ink jet printer interface 11 provides, in a conventional manner, gating, logic, handshaking, suitable amplification, and an output from the master clock to the system clock 12 wherein frequency divider circuits divide the master clock frequency into the clock frequency T1–T4 illustrated in FIG. 9. The signals from the I/O channel may be suitably amplified and buffered so as to receive serial instructions from the microprocessor 10.

The data input into the printer system electronics for print commands is three 8 bit bytes, the makeup of which is more fully explained hereafter. By way of example, assuming that the writing line is a maximum of 14 inches long, and dividing each inch into 60 segments as has heretofore been described relative to the grating 9*c* (FIG. 1), is 840 segments (60 segments/inch × 14 inches) and a single byte of information will give only $2^8$ or 256 bits which is insufficient. Therefore since at least 840 bits are required to give the position code to the printer in our example 14 inch line, and $2^{10}=1024$ bits is the closest to the actual position code, 2 bytes are necessary for command position signals from the processor to the printer. Moreover, in the actual system employed an additional 8 bits are required to identify the command signal as to the character to be printed, on the function to be performed and thus the printer interface 11 includes a buffer for those 3 bytes of information that come from the processor for driving the printer. In the 6640 ink jet printer, the first byte of a print command outputted on the IO channel by the microprocessor of the 3 byte signal is an address which is applied through the interface 11 to character generator 13 telling the character generator which character is to be printed. (Assuming recognition as a print command). The character generator 13 outputs an address or a portion of the inputted address through the address bus ADD to the font memory 14 which permits data to be extracted from the font memory 14 through the data bus 15 and applied to the character generator. The print data extracted from the font memory 14 through bus 15 is data for a single vertical scan of the printer for the particular character which is to be printed.

The second and third bytes of the 3 byte signal from the microprocessor is applied to what, for lack of a better name, will be termed a mechanism control logic circuit 16 to give information to the mechanism control as to where the location of the first scan of the character to be printed is to be set.

The first byte of a function command is applied through interface 11 to the mechanism control logic circuit 16 to be decoded and used to initiate the appropriate action, for example the bit pattern 11010101 is decoded as a tab and 10110101 is decoded as a backspace. The second and third bytes of the three byte function command from the microprocessor may also be applied to the mechanism logic control circuit 16 to be used to effect appropriate control actions when the carrier is at the location specified by these bytes, for example if a tab is decoded, the second and third bytes specify the stopping location of the carrier upon completion of the tab function.

Under the functional block mechanism control 16 may be included many functions. For example: (1) the control and timing of the stream maintenance 18 circuitry such as illustrated in the co-pending patent application of Neville and Taylor, Ser. No. 847,453, filed on Oct. 31, 1977, (now U.S. Pat. No. 4,136,345, issued on Jan. 23, 1979) and which is incorporated herein by reference, which monitors the ink stream at predetermined intervals to determine whether the deflected height of the drop is within tolerances; (2) to act as a command decoder for the sync and servo operations of the ink pump such as the servo control of ink pump illustrated in U.S. Pat. No. 3,787,882; (3) to control the carrier driver *7a* and thus the horizontal velocity (in the present instance) of the carrier 7 as through H drive means, as with the aforementioned motor drive control set forth in co-pending application Ser. No. 954,374, filed Oct. 24, 1978 of Morgan, et al, and (4) to receive the grating position signals as from the detector 9 illustrated in FIG. 1 and discussed heretofore with particular reference to the grating detector and detection circuits of the co-pending Cialone, West and Pettit applications. Of course, the speed changer may take the form described in the IBM Technical Disclosure Bulletin, Vol. 20, No. 10, March 1978, pages 3993 and 3994. But the variable speed drive described in the Morgan et al application is preferred.

When the scan information derived from the font memory 14 has been loaded into the character generator shift register 39 (see FIG. 7), a signal goes out the control bus 13*a* to the mechanism control 16 which causes the mechanism control to put itself into a position ready to print, that is at the print position. With the scan information in the character generator 13, and a print signal being admitted to the mechanism control across control bus 13*a*, a scan ready signal is admitted from the character generator 13 through bus 13*b* to the drop placement logic circuitry 19. A second signal, from the mechanism control 16, start of scan (MCSOS) with coincidence of the carrier movement at a predetermined point on the grating 9*c* (FIG. 1), which information came from the second two bytes of the initial three byte signal applied by the microprocessor 10, effects an output of the drop placement generator 19 to a digital to analog converter 20 through bus 19*a* to apply charge electrode voltage to the charge electrode 4 (FIG. 1) of the printer, to charge the stream of ink drops to form the scan in accordance with the scan information emanating from the font memory 14 to the character generator 13.

The character generator 13 continues to load scan information from the character selected by the first byte of the three byte signal and continues to emit a print signal through control bus 13*a* to the mechanism control such that the cycle to print one character is continued until an end of character signal is emitted from the character generator through the bus 13*a* to the mechanism control circuitry 16. Additionally, while it requires coincidence of two signals to the drop placement logic circuitry or logic 19 from the character generator 13 and from the mechanism control circuitry, i.e., a scan ready and an MCSOS (which is converted as will be shown hereinafter to an SOS or start of scan signal), the drop placement circuitry provides a further signal which holds the signals until it is ready to accept the new data from the character generator which is utilized to charge the charging electrode of the printer. Moreover, if new information, for example another character is to be printed immediately after the first one, the print signal on control bus 13*a* is designed to override the end of character signal so as to continue to output the scan ready signal, withdraw the information from font memory, etc. necessary to provide the charging values to the charging electrode. In this connection, it should be noted that the font memory 14 may include a multiplicity of read only memory structures, which font to be selected being dependent upon the input from the microprocessor 10. A scheme for changing fonts by simply selecting different memory portions is illustrated in U.S. Pat. No. 3,964,591 issued on June 22 1976.

In the quality mode of printing to form characters such as the character "B" illustrated in FIG. 2, the machine operates essentially as set forth above, and this is the system, as described, for the IBM 6640 Document Printer.

Many times, however, it is unnecessary to provide a print resolution as fine as the high quality mode of printing illustrated in FIG. 2, being desirable to provide faster copy than is possible in the high quality print mode which is drop rate limited. Accordingly,, a draft mode of printing or mode 1 to produce characters such as illustrated in FIG. 3 such as the character "B" may be desired. To this end, and turning now to FIG. 5, a draft mode logic circuitry 30 is positioned intermediate the mechanism control circuitry 16 and the drop placement cicuitry 19 such that when printing is to take place as indicated by the suitable print function command from the microprocessor 10, in the quality mode, the circuitry 30 will permit direct access of the drop placement circuitry 19 by a start of scan signal (SOS) which is really MCSOS, bypassing the draft logic circuitry 30. Alternatively, when the microprocessor input to the printer system indicates that a draft mode quality is desired, the draft logic circuitry 30 is brought into play.

Figure 6:
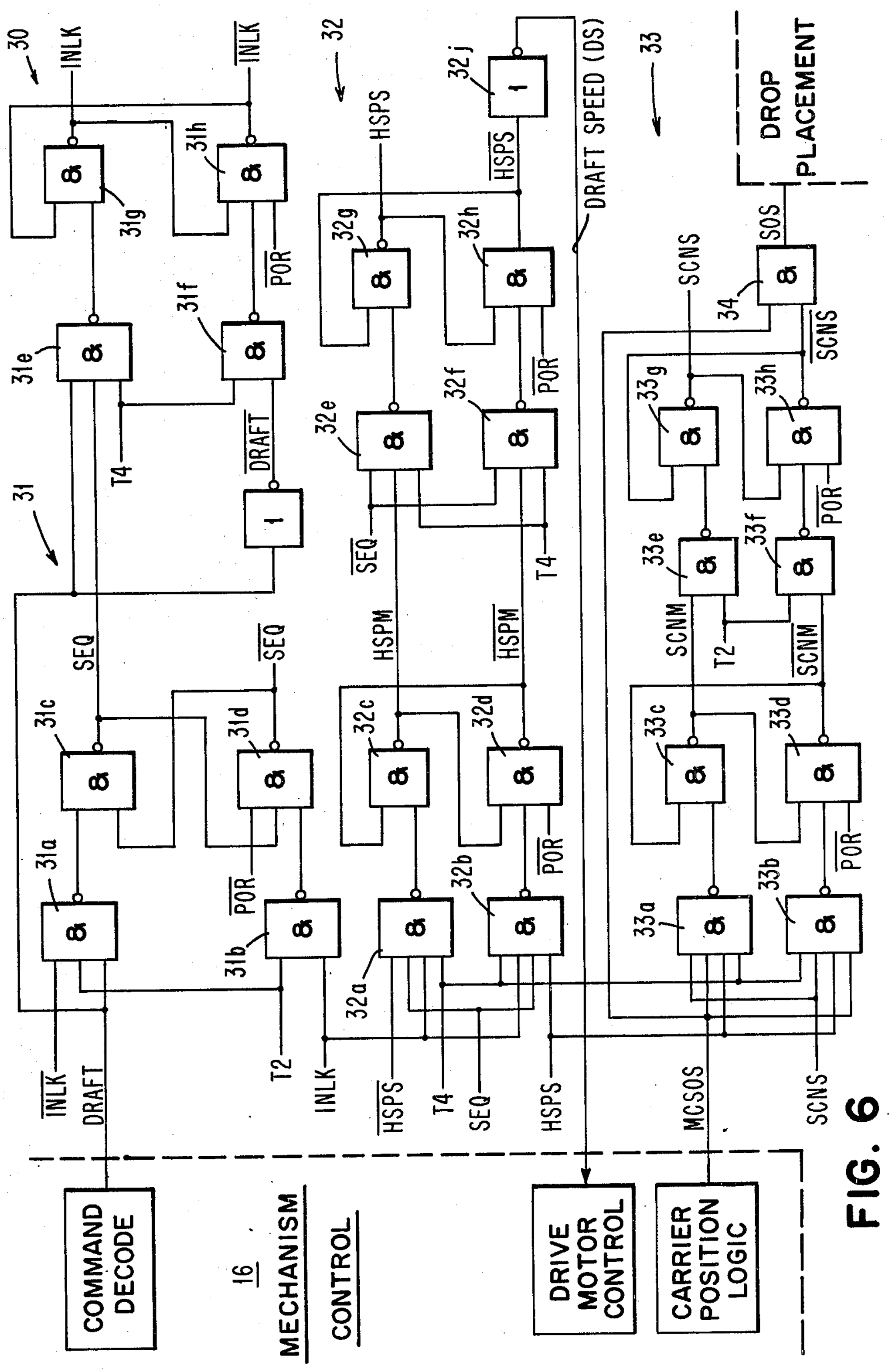
FIG. 6 is a schematic logic diagram illustrating a first "draft" mode logic.
Figure 7:
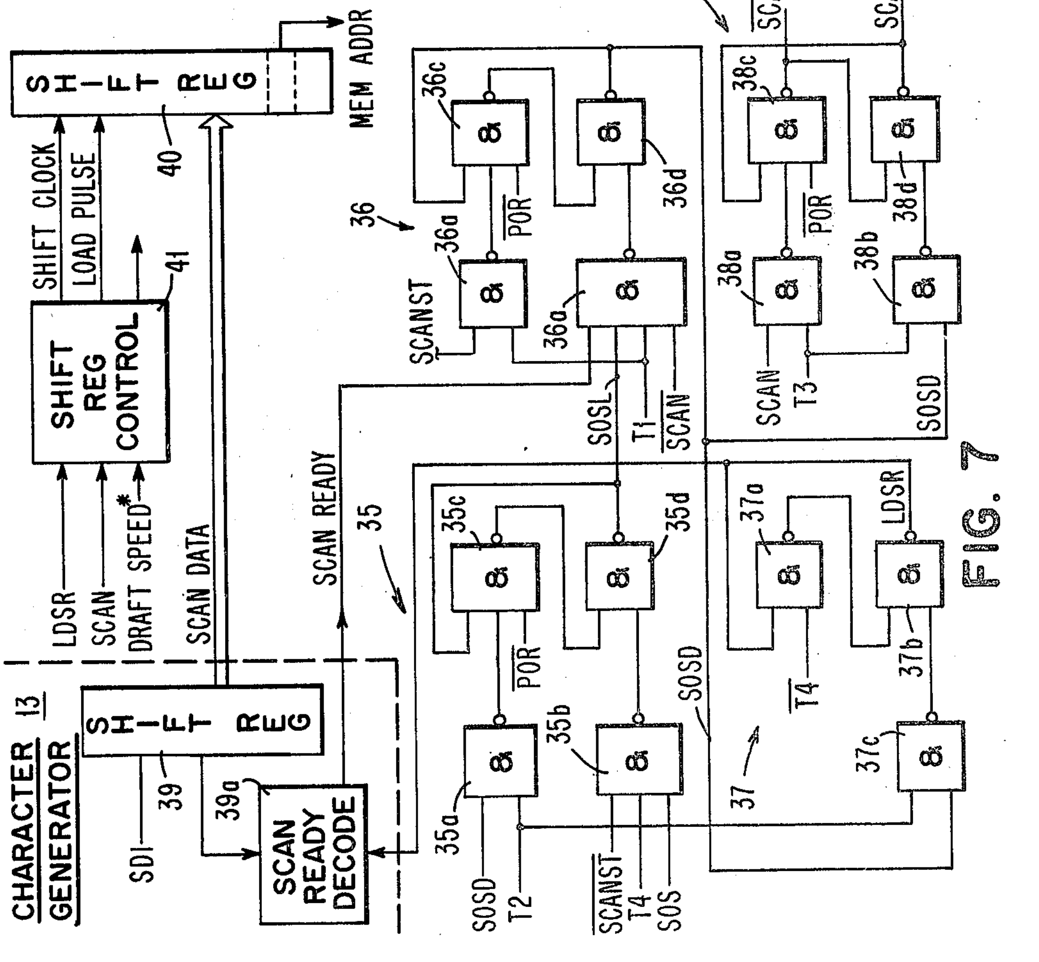
FIG. 7 illustrates the drop placement circuitry and logic diagram for the first "draft" mode logic.

To this end, and referring now to FIG. 6, with a signal (a portion of the three byte signal coming from the microprocessor 10) decoded in the mechanism control indicating the speed of the machine is to be increased and the resolution is to be decreased to the draft mode to form characters such as illustrated in FIG. 3, a command decode logic of for example 11110100 produces the first signal (DRAFT), the first occurrence indicating a shift to draft mode. The DRAFT signal (See FIG. 9) is applied to an input of a logic master slave flip flop or latch pair 31 to produce several signals at various clock times T1-T4 as illustrated in the designated clock sequences shown in FIG. 9. As illustrated in FIG. 6, the master slave flip flop or latch pair 31 is composed of NAND gates, in the particular embodiment shown, NAND gates 31*a*–31*h* and a single inverter 31*j* to produce the signals interlock (INLK), not interlock ($\overline{\text{INLK}}$), sequence (SEQ), not sequence ($\overline{\text{SEQ}}$), and not draft ($\overline{\text{DRAFT}}$). The power on reset (POR) or not power on reset ($\overline{\text{POR}}$) signals are the conventional signals derived from the logic utilized for initializing the machine at its start up. As shown, the signal inputs to the master slave flip flop 31 are the clock pulses T2 and T4 as well as the first or draft signal DRAFT from the command decode section of the mechanism control circuitry 16. As illustrated, these signals are coupled into a logic second master flip flop or latch pair 32 which produces as an output a draft speed signal DS which is applied as an output to the drive motor control such as illustrated in co-pending patent application Ser. No. 954,374 and incorporated herein by reference heretofore to speed up the carrier driver or drive motor 7*a* associated with the carrier 7 of the printer.

As illustrated, the latch pair or master slave flip flop 32 is also composed of NAND gates 32*a*–32*h* with an inverter 32*j* at the output of the master slave flip flop. Some of the inputs to the master slave flip flop 32 are generated by that latch pair, for example high speed pick master (HSPM) and not high speed pick master ($\overline{\text{HSPM}}$) which results in the high speed pick slave (HSPS) and not high speed pick slave ($\overline{\text{HSPS}}$) signals which are returned as inputs to the NAND gates 32*a* and 32*b* along with clock pulse T4. The SEQ,INLK signals are taken from the master slave flip flop or latch pair 31.

A third master flip flop or latch pair 33 receives a mechanical control start-of-scan signal (MCSOS) from the carrier position logic which is part of the mechanism control 16. As heretofore explained, the MCSOS signal is derived from the detector 9 (see FIG. 1) and its associated circuitry. Moreover, as will become more clear hereinafter, the MCSOS signal and start of scan signal (SOS) are one and the same when the printer is in the quality mode of printing, that is to form characters such as shown in FIG. 2. As described heretofore, the MCSOS signals generated are a multiple of the number of lines on the grating. Thus in the example given, if the grating lines are 60 lines per inch (23.6 lines per centimeter), 240 pulses (4 times 60) will be generated for each inch of carrier travel (94.5 MCSOS pulses every centimeter of travel). As the carrier speeds up, of course, the repetition rate of these pulses increases, but the distance traveled which is representative of each of the pulses will always remain the same. In this connection, the master slave flip flop or latch pair 33 acts as a divide by two circuit generating a scan master (SCNM) and scan slave (SCNS) signal as well as the logical nots of the signals all with relation to the master clock times T2 and T4 which are utilized as inputs to the latch pair 33. Moreover, as before, the latch pair or master slave flip flop 33 is comprised of NAND gates 33*a*–33*h*, gate 33*h* having an output not scan master ($\overline{\text{SCNS}}$) which provides a first input to AND gate 34. AND gate 34 has a second input which bypasses the latch pair 33 and is the mechanical control start of scan signal (MCSOS). In this manner, the $\overline{\text{SCNS}}$ signal being high and the MCSOS signal being high, at their coincidence, emits an output from the NAND gate 34 of SOS. Since the master slave latch pair 33 acts as a divide by two circuit, when in the draft mode the $\overline{\text{SCNS}}$ is high only a portion of the time (i.e., ½) and therefore SOS has only half the frequency of the MCSOS signal. In this manner, the SOS or start of scan signal illustrated in FIG. 3 is only half the frequency of the SOS signal illustrated in FIG. 2 thus omitting every other scan as compared to that in the quality print mode. Moreover, in the quality mode, the scan slave signal $\overline{\text{SCNS}}$ is always high, and therefore upon state coincidence of the MCSOS signal with the $\overline{\text{SCNS}}$ signal through NAND gate 34, the repetition rate of the SOS signal is necessarily the same as the MCSOS signal. The various inputs to master slave flip flop or latch pair 33 are generated by master slave flip flop 32 (high speed pick slave) HSPS, and by master slave flip flop or latch pair 33 itself, as may be seen from the drawing.

Upon generation of the appropriate start of scan SOS signal, this signal is fed into the drop placement generator logic circuitry 19 which is activated, as set forth heretofore, by the coincidence of a scan ready signal and a start of scan signal SOS which comes from the mechanism control. The scan ready signal, of course, comes from the character generator 13, in a manner which will be explained hereinafter. As shown best in FIG. 7, the drop placement logic circuitry 19 includes an input latch or RS flip flop 35, which is coupled to a second latch or RS flip flop 36, and a third latch or flip flop 37 with appropriate input signals into a latch pair or master slave flip flop 38. Each of the latches or RS flip flops 35–37 is comprised of NAND gates 35*a*–35*d*, 36*a*–36*d*, 37*a*–37*c*, while latch pair 38 is comprised of NAND gates 38*a*–38*h*. A forty-seven bit shift register 40 which is controlled by a shift register control circuit 41 permits the scan data, in a manner to be more fully explained hereinafter, to be unloaded from the shift register 40 through the bus 19*a* to the digital to analog converter or DAC 20 (FIG. 5) and thus to the charge electrode 4 associated with a nozzle 2*a* of the drop generator 2.

The operation of the drop placement logic circuitry 19 is as follows. When the start of scan signal SOS is applied to the latch or RS flip flop circuit 35, if the remainder of the circuitry composed of latch pairs 38, and other latches 37 and 36 have completed their operations from the previous scan, the latches will emit a load shift register signal LDSR (see output LDSR from NAND gate 37*b*) which will permit data (one scan of data) to be transferred from the forty bit shift register 39 in the character generator 13 into the scan data register 40 (47 bit shift register) in the drop placement logic 19. As illustrated, the forty bit shift register 39 in the character generator 13 has a serial data input SDI which receives scan data derived from the font memory. When the shift register 39 is loaded, a signal is outputted to the scan ready decode circuit 39*a* (a multi input AND gate) which with a coincidence of LDSR from gate 37*b* indicates that a scan is ready. As noted, shift register control 41 requires the same load shift register signal LDSR along with the SCAN signal which is outputted from latch pair 38 (NAND gate 38*h*) to permit the scan data to be unloaded along bus 39*d* to the forty-seven bit shift register 40, and ultimately outputted through the bus 19*a* to the digital to analog converter 20.

The latch or RS flip flop 35 serves to store the SOS or start of scan signal until the previous scan is completed (note the requirement of NAND gates 35*a* and 35*b* for an input of start of scan delayed (SOSD) as well as clock time T2 while that for NAND gate 35*b* of SCANST which is scan stored and clock time T4). The scan stored SCANST signal is outputted from latch pair 38 while SOSD (start of scan delayed) comes from the output of latch 36. In this manner, the circuit illustrated in FIG. 7 allows for exceptionally long serial scan data which may overlap the next adjacent start of scan SOS signal while permitting the scanned data to catch up when the scan data on the preceding and succeeding scans is shorter than the exceptional long serial scan data.

Figure 8:
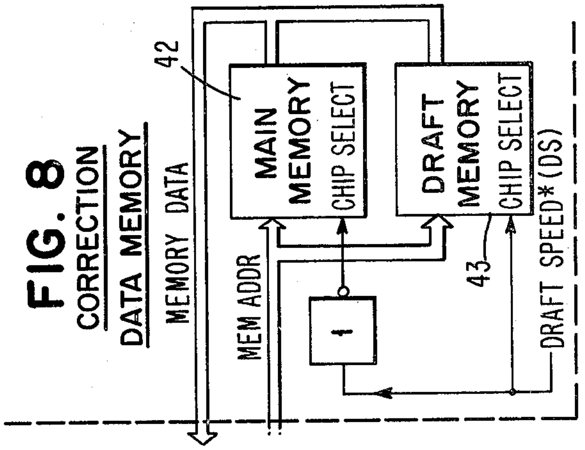
FIG. 8 is a schematic diagram of correction data memory employed in the alternate "draft" mode.

In the IBM 6640 Document Printer, it is necessary to compensate for aerodynamic effects on the ink drops, as well as the induction effect of one charge drop upon the next charge drop so that the drops will be applied to the paper in their proper relative position. The scheme which is employed in the IBM 6640 document printer is described in U.S. Pat. No. 4,086,601 issued on Apr. 25, 1978 to Fillmore, et al. As disclosed in the aforementioned patent, the output of the least significant bits of shift register 40, for example the last 7 bits or even more are used as a memory address to the main memory 42 of a correction data memory, as illustrated in FIG. 8. The output of the main correction memory 42 is applied to a memory data bus which is in turn gated to the DAC 20 via bus 19*a* to apply the scan data voltage that should be applied to the charge electrode for each bit representation of a drop in the scan. The correction data memory includes a pedestal voltage, in the event that a drop is to be printed, so that the drop may clear the gutter. For a more detailed discussion of the guard drop scheme employed, reference to the aforementioned U.S. patent is suggested.

In an alternative mode of operation, instead of "scan skipping", the machine may be set up to provide row skipping or alternate dot skipping during the vertical scan of the drops in forming a letter or a character. (While this alternate embodiment is not the preferred embodiment, with certain character fonts, the visual impression may be more pleasing). For example, every other drop which normally would be printed in the quality mode may be skipped so that the machine, in a like manner as with scan skipping may be speeded up to approximately twice its quality mode speed. In this connection, in FIG. 6, the latch pair 33 is unnecessary and MCSOS may be directly connected to the RS flip flop 35 illustrated in FIG. 7, MCSOS then equalling SOS for signal purposes. However, the basic circuitry remaining in FIG. 6 may be utilized for obtaining a DRAFT SPEED (DS) signal to the drive motor control for increasing the speed of the carrier.

The second modification that is required in order to achieve a horizontal row skip or so that in one scan only every other dot is printed is the application of the draft speed signal to the shift register control 41 (note DRAFT SPEED*) to allow alternate ones of the scan data for bus 39*b* to be loaded into shift register 40, as under control of the load pulse output from the shift register control 41. In this manner, the shift register is loaded only with alternate binary information which indicates that every other drop is a gutter drop. The third alteration that is necessary, and assuming once again the same guard drop scheme that is described in the U.S. Pat. No. 4,086,601, is to select the draft memory 43 to thereby make aerodynamic and induction charge correction to the drops as through the memory data (MEM DATA) bus as an output from the draft memory 43 instead of the main memory 42.

In another alternate embodiment, the draft mode may include both column skipping and row skipping to achieve a character similar to that illustrated in FIG. 4. In this connection, a combination of the two schemes heretofore described is necessary. That is, the MCSOS start of scan information would have to be operative to permit a alternate or scan skip technique, and the DRAFT SPEED* signal level would be applied to both the shift register control 41 and the draft memory 43 for correction data memory select purposes. Additionally, the microprocessor 10 would necessarily indicate to the machine control that the draft mode requested was to be approximately 4 times that of the quality mode speed, which signal may be derived both from the DRAFT SPEED (DS) signal derived in FIG. 6, and a second signal from the microprocessor, which was, for example, ANDED to indicate the faster speed requirement mandated by the microprocessor.

Thus the present invention provides an ink jet printer having the capability of varying its character resolution with a comensurate change in the speed of printing with relative minor modifications to existing machinery.

Although the invention has been described with a certain degree of particularity, it is understood that the present disclosure has been made only by way of example and that numerous changes in the details of construction and the combination and arrangement of parts may be made without departing from the spirit and scope of the invention as hereinafter claimed:

What is claimed is:

1. In a continuous ink jet printer in which a carrier carries a nozzle for emitting a stream of ink drops at a predetermined rate, an ink drop charging electrode and ink drop deflection electrodes, said carrier being driven orthogonally with respect to an ink drop receiving medium by a variable speed drive means to effect printing on said medium of characters by scanning of ink drops thereon, a first predetermined character resolution defined by a predetermined maximum number of picture elements per unit of length and height in a predetermined size character box, an improvement in the speed of formed characters on said ink drop receiving medium while maintaining the predetermined rate of sid ink stream, said improvement comprising: means responsive to an applied input signal for increasing the speed of said variable speed drive means, and other circuit means responsive to said applied input signal to reduce the number of picture elements in said predetermined size character box to thereby produce characters having a second predetermined character resolution.

2. In a continuous ink jet printer in accordance with claim 1 wherein the reduction in the number of picture elements is per unit of length.

3. In a continuous jet ink jet printer in accordance with claim 1 wherein the reduction in the number of picture elements is per unit of height.

4. In a continuous jet ink jet printer in accordance with claim 1 wherein the reduction in the number of picture elements is per unit of length and height.

5. In an ink jet printer having a carrier with a nozzle mounted thereon for emitting a continuous stream of ink drops towards an ink drop receiving medium at a predetermined rate, charge electrode means associated with said nozzle and stream to charge ink drops in accordance with desired characters to be printed, and deflection electrode means for deflecting the charged ink drops in accordance with a charge thereon whereby characters are formed by scanning said charged droplets onto said ink drop receiving medium;

character generator means for generating data representative of the charge to be placed on selected drops of a single scan, and detection means to indicate the position and direction of movement of said carrier at any point in time and for generating a first signal comprising a start of scan signal indicative of the time of the start of each scan of ink drops in the formation of a character;

alterable speed carrier drive means for moving said carrier in a direction orthogonally to the direction of motion of said scan, ink drop placement circuit means for receiving said data and said first signal and coupled to said charge electrode for charging said ink drops in accordance with said data to form a single character at a first resolution and at a first speed of carrier movement, an improvement in the speed of forming characters on said ink drop receiving medium while maintaining the predetermined rate of said ink stream, said improvement comprising:

first circuit means for receiving a second signal indicating a change in speed of formation and resolution of a character, said first circuit means including means for generating a third signal upon receipt of said second signal for changing the speed of said drive means to a second speed of carrier movement greater than said first speed;

second circuit means responsive to said second signal for causing the ink drops forming a single character to be formed at a second resolution and at a second speed of carrier movement greater than said first speed.

6. In an ink jet printer in accordance with claim 5 wherein said second circuit means includes means responsive to said second signal and said first start of scan signal for regularly or periodically effectively eliminating the start of scan signal.

7. In an ink jet printer in accordance with claim 5 wherein said second circuit means includes means for rendering selected ones of said start of scan signals inoperable.

8. In an ink printer in accordance with claim 6 including means for by-passing said second circuit means to permit application of said first signal to said ink drop placement circuit in the absence of said second signal.

9. In an ink jet printer in accordance with claim 5 including means for applying said third signal to said ink drop placement circuit means, and means for eliminating the data representative of the charge to be placed on alternate drops of a single scan.

10. In an ink jet printer in accordance with claim 9 wherein said means is responsive to said third signal for eliminating the data representative of the change to be placed on alternate drops of a single scan.

11. An ink jet printer comprising in combination:

an ink drop receiving medium;

a nozzle for emitting a continuous stream of ink drops towards said drop receiving medium at a predetermined rate, said nozzle being spaced from said drop receiving medium;

charge electrode means adjacent said nozzle means for charging ink drops in accordance with desired indicia to be placed on said drop receiving medium, and deflection electrode means for deflecting the charged ink drops in accordance with the charge thereon whereby indicia is formed by scanning said charge drops onto said ink drop receiving medium;

carrier means mounting said nozzle means, charge electrode means and deflection electrode means thereon for moving in a path adjacent to said drop receiving medium;

character generator means for generating data representative of the charge to be placed on selected drops of a single scan, and detection means to indicate the position and direction of movement of said carrier at any point in time and for generating a first signal including a start of scan signal indicative of the time of start of each scan of ink drops in the formation of indicia;

carrier drive means for moving said carrier in said path orthogonal to the direction of motion of said scan, ink drop placement circuit means for receiving said data and said first signal and coupled to said charged electrode for charging said ink drops in accordance with said data to form a single indicia at a first resolution and at a first speed of carrier movement;

said first resolution defined by a predetermined maximum number of picture elements per unit of length and height in a predetermined size indicia box;

a second signal, and first circuit means responsive to said second signal for changing the second of said drive means;

and other circuit means responsive to said second signal to reduce the number of picture elements in said predetermined size indicia box to thereby produce indicia having a second predetermined resolution.

12. An ink jet printer in accordance with claim 11 wherein the reduction in the number of picture elements is per unit of height.

13. An ink jet printer in accordance with claim 11 wherein the reduction and number of picture elements is per unit of length.

14. An ink jet printer in accordance with claim 11 wherein the reduction in a number of picture elements is per unit of length and height.

15. An ink jet printer in accordance with claim 11 wherein said first circuit means for receiving a second signal indicating a change in speed of formation and a decrease in the resolution of indicia includes means for generating a third signal upon receipt of said second signal for changing the speed of said drive means to a second speed of carrier movement greater than said first speed.

16. An ink jet printer in accordance with claim 15 wherein said other circuit means includes means for rendering selected ones of said start of scan signals inoperable.

17. An ink jet printer in accordance with claim 15 wherein said other circuit means comprises means responsive to said second signal and said first start of scan signal for regularly or periodically effectively eliminating the start of scan.

18. An ink jet printer in accordance with claim 15 including means for bypassing said other circuit means to permit application of said first signal to said ink drop placement circuit means in the absence of said second signal.

19. An ink jet printer in accordance with claim 15 including means for applying said third signal to said ink drop placement circuit means, and means for eliminating the data representative of the charge to be placed on alternate drops of a single scan.

20. An ink jet printer in accordance with claim 19 wherein said other circuit means includes means responsive to said second signal and said first signal for eliminating predetermined start of scan signals.

* * * * *